United States Patent

Bach et al.

Patent Number: 6,058,624
Date of Patent: May 9, 2000

[54] SPRAY DRYING METHOD AND APPARATUS AND CLEANING METHOD FOR SUCH AN APPARATUS

[75] Inventors: Poul Bach, Birkerød; Keith Masters, Bagsværd, both of Denmark

[73] Assignee: Niro A/S, Soborg, Denmark

[21] Appl. No.: 08/793,993

[22] PCT Filed: Feb. 20, 1997

[86] PCT No.: PCT/DK97/00078

§ 371 Date: Feb. 25, 1997

§ 102(e) Date: Feb. 25, 1997

[87] PCT Pub. No.: WO97/14288

PCT Pub. Date: Apr. 24, 1997

[30] Foreign Application Priority Data

Feb. 20, 1997 [WO] WIPO ............... PCT/DK97/00078

[51] Int. Cl.[7] .................................................. F26B 7/00
[52] U.S. Cl. .................................. 34/374; 34/82; 34/377
[58] Field of Search .............................. 34/82, 585, 373, 34/372, 374

[56] References Cited

U.S. PATENT DOCUMENTS

| 4,190,622 | 2/1980 | Landis | 264/14 |
|---|---|---|---|
| 4,953,308 | 9/1990 | Basten et al. | 34/82 |
| 5,135,611 | 8/1992 | Cameron | 159/4.01 |
| 5,446,974 | 9/1995 | Gubler | 34/82 |
| 5,632,100 | 5/1997 | Hansen | 34/374 |

FOREIGN PATENT DOCUMENTS

| 0 520 953 | 12/1992 | European Pat. Off. . |
|---|---|---|
| 2113112 | 8/1983 | United Kingdom . |

*Primary Examiner*—Henry Bennett
*Assistant Examiner*—Pamela A. Wilson
*Attorney, Agent, or Firm*—Sughrue, Mion, Zinn, Macpeak & Seas, PLLC

[57] ABSTRACT

In fluidized spray drying of a feedstock to produce an agglomerate product by means of at least one spraying device (7) arranged in the upper part (2) of a vertically disposed drying chamber (1), in a lower part of which a fluid-bed is accommodated, a drying gas introduced into a processing zone (16) of the chamber (1) is exhausted through an integrated arrangement of filter elements (11) in the upper chamber part (2) to retain and allow agglomeration of the particles carried by the flow of drying gas on the filter elements (11).

By intermittent supply of reverse flow gas pulses to the filter elements (11) the retained particles are released and returned to agglomeration zones (16, 17).

The drying gas is introduced at a rate producing at the filter walls (13) a flow rate amounting to at least 150 cubic meters per hour per square meter of filter wall surface.

In the non-operative condition of the spray drying apparatus the filter elements (11) may be cleaned-in-place by supplying a cleaning liquid to the interior of the elements.

20 Claims, 2 Drawing Sheets

SPRAY DRYING METHOD AND APPARATUS AND CLEANING METHOD FOR SUCH AN APPARATUS

BACKGROUND OF THE INVENTION

This invention relates to a method of spray drying a feedstock to produce an agglomerated product, comprising the steps of supplying said feedstock to at least one spraying device arranged in the upper part of a vertically disposed drying chamber, introducing a drying gas into a processing zone of the chamber outside said spraying device, forming a layer of fluidized particles in a lower region of the chamber and exhausting said drying gas from the chamber through outlet means disposed in said upper chamber part.

Whereas the term "spray drying" refers, in general, to processes in which a fluid feedstock is at a relatively low temperature compared to the temperature of the drying gas, the feedstock may also be at a relatively high temperature with respect to the gas in processes which are sometimes referred to as "spray cooling". In the context of the present invention the generic term "spray drying" is used to encompass all such processes in which a fluid feedstock is sprayed into a drying gas.

Spray drying methods involving, in addition to the spraying of a liquid feedstock as small droplets of preferably uniform size distribution into a hot stream of drying gas, the use of a fluid bed integrated in the lower part of the drying chamber to expose the primary spray particles to further drying and classification are well known in the art and serves to produce a free flowing agglomerated product having desirable properties for many types of spray dried products such as dairy, food, pharmaceutical and chemical products, in particular socalled "instant" properties requiring high wettability and solubility and/or with specified properties with respect to flowability and absence of small particles or fines, the presence of which in the product may cause handling problems and less acceptable conditions of occupational health in the performance of such methods.

Typically, these methods also known as the MSD™ or FSD™ process (Trademarks of NIRO A/S) involves the steps of atomizing a liquid feedstock into a spray of small droplets in the processing zone, where the droplets are contacted with the hot drying gas stream having a high velocity to produce partly dried primary particles, and formation of agglomerates by mixing the primary particles with fine or dustlike particles also known as fines, which are entrained from the drying chamber itself or returned to the agglomeration zones in the chamber from auxiliary equipment such as a cyclone outside the drying chamber, in which fines are retrieved from the exhaust of drying gas from the drying chamber, and subsequent additional drying in the fluid bed also serving to provide cooling of the agglomerated particles.

The main agglomeration zones in the chamber are the spraying zone or nozzle cloud immediately outside the spraying device, which is typically a spraying nozzle, the fluid bed which is typically located in the lower part of the chamber and on the inner surface of a conical part of the chamber, if present.

Typical prior art spray drying devices for the performance of the MSD and FSD methods as described can be found in published International Patent Application WO 95/24599, EP-B-097 484, EP-A-0 749 769 and EP-A-0 749 770 all of which suggest after-treatment of the product obtained from the fluid bed in a further fluid bed either by designing the fluid bed integrated in the drying chamber as a two stage fluid bed or arranging a separate after-treatment fluid bed outside the drying chamber.

In many agglomeration processes the return of fines to the agglomeration zones of the drying chamber plays a significant role for the result to be obtained, and the properties of the agglomerated product will depend on many factors such as the part of the chamber to which fines are returned, such as discussed in EP-A-0 378 498 and WO 95/13864.

As disclosed therein as well as in EP-A-0 749769 conventional prior art suggestions for return of fines for use in an agglomeration process have suffered in general, however, from the disadvantage that the fines to be returned must be collected outside the chamber and transported to the chamber by a sometimes quite complicated ducting system.

Moreover, for a number of products incorporating poisonous, polluting or otherwise dangerous or hazardous chemicals such as a number of pharmaceutical products, dyestuffs etc. it is highly desirable and likely to become an environmental demand to improve safety by avoiding the handling of such materials outside the processing chamber.

In U.S. Pat. No. 4,657,767, DE-A1-195 08 657 and DE-A1-195 11 961 the incorporation of integrated filter elements in dryers is disclosed per se. U.S. Pat. No. 4,657,76 discloses a substantially horizontally disposed processing chamber with the spraying device and an arrangement of bag-type filter elements located at opposite ends of an upper chamber zone, whereby agglomerates formed to some extent on the filter elements are only dislodged to the region underlying the filter arrangement which is outside the main agglomeration zone. Also in DE-A-195 08 657 a horizontally disposed chamber is disclosed in which a filter wall extends throughout the chamber above the processing zone without any precautions to dislodge material retained by the filter. DE-A1-195 11 961 discloses incorporation of filter elements in a direct flow drying chamber, substantially midway between a feeding device arranged in an upper part of the vertically disposed chamber and a fluid bed in the lower part thereof.

SUMMARY OF THE JUDGEMENT

With this background, it is the object of the invention to provide a spray drying method involving the use of an integrated fluid bed and useful for production of agglomerated products of conventional or improved quality, which does not suffer from the above-mentioned disadvantages and provides important additional advantages with respect to a less complicated and more compact overall structure of the spray drying apparatus and in terms of facilitating cleaning of the apparatus, which is of significant importance when a spray drying apparatus is used for processing a range of different products requiring frequent cleaning and readjustment of the chamber.

According to the invention, this is obtained by a method of the kind defined which is characterized in that particles carried by the flow of drying gas towards said outlet means are retained by and allowed to agglomerate on a number of filter elements having substantially non-flexible filter walls and being arranged in the upper chamber part separated from said spraying device or devices and in flow communication with said outlet means, that reverse flow gas pulses are intermittently supplied to said filter elements to release retained particles therefrom to allow said particles to be returned to agglomeration zones in the chamber to participate in the agglomeration in said zones and that said drying gas is introduced at a rate producing at said filter walls a flow rate amounting to at least 150 cubic meters per hour per square meter of filter wall surface.

By retaining the particles carried by the drying gas within the drying chamber itself the need for the complicated fines return systems involving the use of external cyclones or filters with associated pneumatic powder discharge and return transportation systems is completely eliminated.

The exhaust drying gas leaving the chamber is free from all particles, since they are retained by the filters and returned directly to take part in the agglomeration process in the chamber by the intermittent supply of the reverse flow gas pulses. Thereby, the method of the invention is very well suited for application to a socalled "closed cycle" process in which the exhaust drying gas is completely recirculated to the chamber after condensation and there are no gas discharges from the chamber, which is particularly useful for processes including the use of organic solvents or similar hazardous chemicals.

Contrary to the teaching of the prior art of the above-mentioned EP-A-0 378 498 as to the importance of selecting the right point in the drying chamber for the fines return, the invention here has surprisingly shown a very good agglomeration of fine particles having suitable properties with respect to humidity, particle size etc. on the surfaces of filters integrated in the upper part of the drying chamber, the agglomeration acting in combination with the agglomeration in other zones of the chamber. In fact, the invention could rightfully be considered to add a new agglomeration principle which is useful in combination with the agglomeration principles known in the art. The agglomeration on the filter elements is moreover controllable by selection of the physical parameters with respect to the filter loading by the drying gas and the supply of the reverse flow drying gas pulses.

It has further been demonstrated to be perfectly possible to design the integrated filters, which are preferably made with substantially rigid filtering walls of metallic, ceramic or polymeric materials or composites thereof, so that they will work well in the humid conditions prevailing in agglomeration dryers. The term "substantially rigid" is to be understood in the sense that the filtering walls could have a certain modest flexibility to provide for a better distribution of pressure forces.

Moreover, against a prevailing prejudice against exposing filters integrated in conventional drying chambers to a drying gas heavily loaded with particles, which are relatively moist and sticky, the invention has demonstrated that by appropriate arrangement and design of the filter elements and selection of process parameters such as the flow rate of the drying gas and the intermittent reverse gas cleaning pulses, blocking of the filters can be avoided to an extent making the method practical for continuous, contrary to batchwise, FSD dryer operation.

The invention also relates to a spray drying apparatus for carrying out the method as defined above, comprising a vertically disposed drying chamber of substantially circular cross-section, in an upper part of which at least one spraying device is arranged together with feed means for supplying a feedstock and means for introducing a flow of drying gas into a processing zone of said chamber outside said spraying device or devices, whereas in a lower part of the chamber an integrated fluid bed is accommodated for forming and maintaining a fluidized layer of particles resulting from the spray drying performed by the apparatus, outlet means for said drying gas being provided in said upper chamber part.

According to the invention, this apparatus is characterized in that a number of filter elements having substantially non-flexible filter walls are arranged in said upper chamber part separated from said spraying device or devices and in flow communication with said outlet means for retaining particles carried by said drying gas towards said outlet means, said filter elements communicating with a pressurized gas supply for intermittently supplying reverse flow pulses of cleaning gas to the filter elements to release particles retained by the filter elements during operation of the spray drying apparatus, and that means are provided for introducing said flow of drying gas at a rate producing at the filter walls a flow rate amounting to at least 150 cubic meters per hour per square meter of filter wall surface.

Advantageous embodiments of such an apparatus will appear from dependant claims 7 to 16.

A significant advantage of the method and apparatus of the invention comes from the facilitated possibilities for cleaning-in-place of the integrated filters in the non-operative condition of the apparatus allowing for a reduction of the period of non-operation needed for such a cleaning.

Therefore, the invention further relates to a method of cleaning the apparatus which is characterized in that a cleaning-in-place of the filter elements is performed in a non-operative condition of the spray drying apparatus by supplying a cleaning fluid in reverse flow through the filter elements.

Preferably, this cleaning-in-place of the filter elements and cleaning of the interior of the drying chamber are performed in a single coherent process.

BRIEF DESCRIPTION OF THE DRAWINGS

In the following the invention will be described in further detail with reference to the accompanying drawings, in which.

DESCRIPTION OF THE PREFERRED EMBODIMENT

Figure 1:
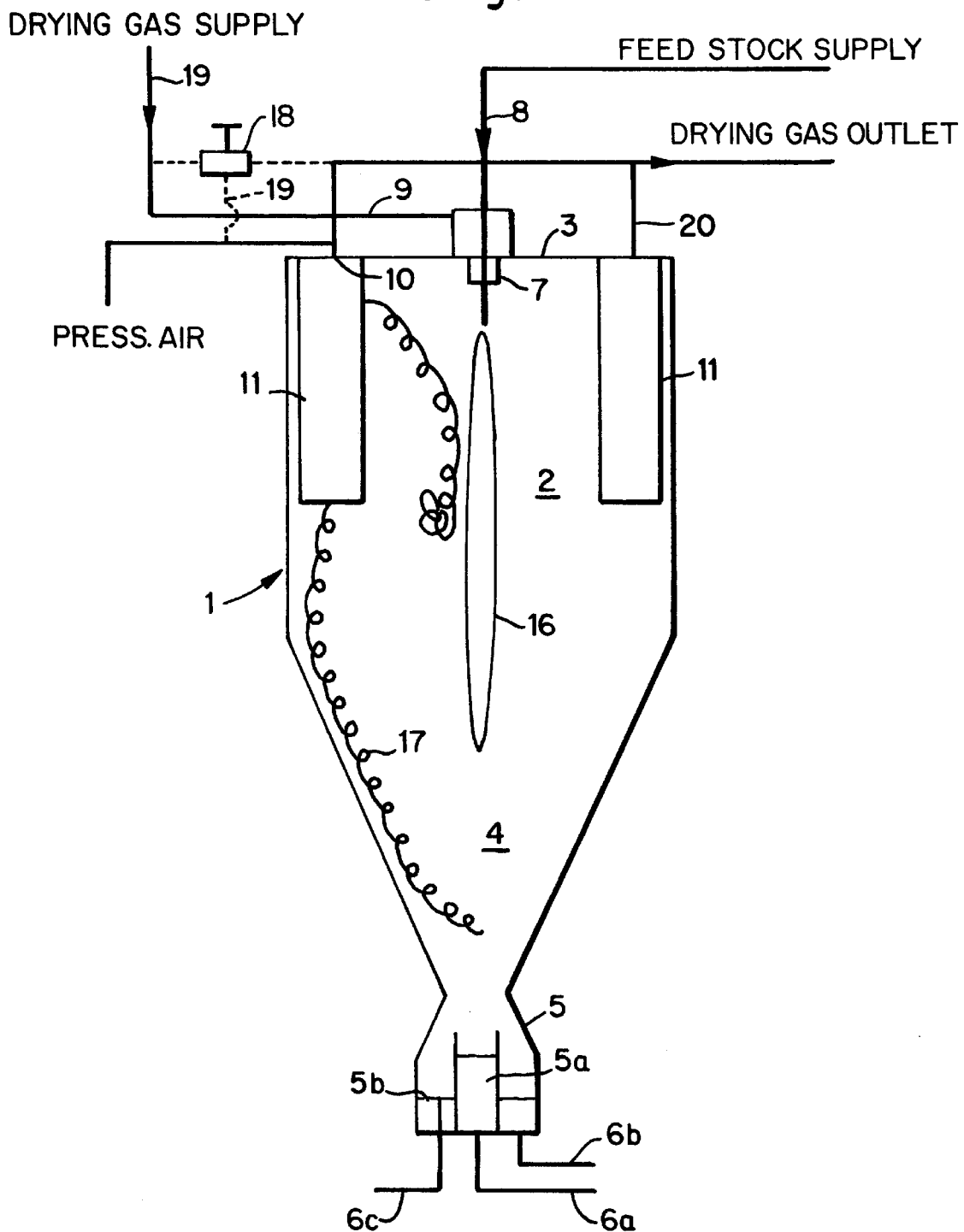
FIG. 1 is a schematical section of a spray drying apparatus embodying the invention.

In FIG. 1 a vertically disposed drying chamber 1 for a spray drying apparatus is shown which comprises a mainly cylindrical upper chamber section 2 with a ceiling 3 and a lower conical chamber section 4 at the bottom of which a fluid bed arrangement 5 of a design known per se is located with supply lines 6a and b for supplying drying and/or cooling gas to a back-mix section 5a and a plug-flow section 5b of the fluid bed arrangement 5, respectively, and a product discharge line 6c.

The fluid-bed arrangement may thus be of the two-stage type disclosed in WO 95/24599, and as disclosed in EP-A-0 749 770 the drying chamber need not be designed with a lower conical section for accommodation of the fluid-bed, but could have an overall cylindrical form. The fluid bed arrangement may also be a single stage fluid bed.

In the illustrated embodiment a single nozzle-type spraying device 7 is arranged in the upper part of the cylindrical upper section immediately below the chamber ceiling 3 to which a supply line 8 for the fluid feedstock to be processed in the chamber is connected. The spraying device 7 could also be suspended, however, a certain distance below the ceiling 3. The fluid feedstock may typically be a liquid dispersion or suspension, but could also be a powder product supplied as feed for a rewetting process by being exposed to wetting by a typically aqueous liquid supplied to a spraying distributor, such supplying and spraying means constituting the spraying device. Rewetting processes are typically used in practice e.g. for coffee powder agglomeration by steam and water, using e.g. a three fluid nozzle as mentioned in the foregoing, or rewetting/mixing a supplementing powder with an agglomerating feedstock containing the main part of the total solids content of the end product.

For liquid feedstocks the spraying device 7 may be of the high pressure nozzle-type or of the two-fluid or three-fluid (e.g. gas, steam, feedstock) types. The spraying device may also be a rotating distributor, e.g. a wheel or cup in such designs as known in the art.

Together with the spraying device 7 supply means 9 for introduction of a drying gas, which in the example illustrated may be a hot drying gas typically having a temperature between 100° and 550°, is connected with the central part of the chamber ceiling 3. The velocity of the drying gas may be varied within wide limits depending on the actual selection of spraying device.

Connected to a peripheral region of the chamber ceiling 3 is an outlet system for the drying gas comprising an exhaust manifold duct 10.

Figure 2:
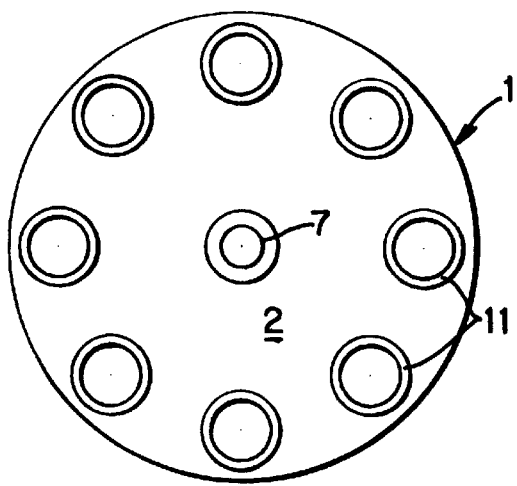
FIG. 2 shows an embodiment of an arrangement of filter elements for use in the apparatus in FIG. 1.

In the illustrated embodiment a number of discrete filter elements 11 are connected to the chamber ceiling 3 and may be arranged, symmetrically around the spraying device 7, as shown in FIG. 2, and in flow communication with the exhaust manifold duct 10. The filter elements need not necessarily be connected to the ceiling 3, but could also be secured in the upper part of the cylindrical chamber wall.

Moreover, the individual filter elements need not be identical in shape and size, but could be of different designs and sizes.

The invention may also be applied, however, to spray drying chambers in which several spraying devices are used, and in such cases the spraying devices could be arranged centrally in the way described, but could also be arranged symmetrically around a central arrangement of filter elements or a single filter element.

Figure 3:
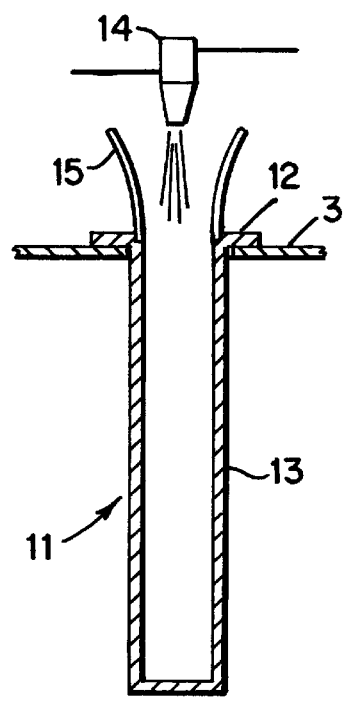
FIG. 3 shows an embodiment of an individual filter element.

As shown in more detail in FIG. 3 the individual filter elements 11 may be of an elongate, preferable substantially cylindrical form closed at the bottom and connected at the top with a fixture 12 to be secured to the chamber ceiling 3. Each filter element has an active filtering wall 13 which is preferably made of a substantially rigid metallic, ceramic or polymeric material, preferably a sintered metallic material like sintered stainless steel fibres as disclosed in the Article "Sintered Metal Filter Elements for Use with Dryers and Mills in the Pharmaceutical Industry", Filtration & Separation, November/December 1996 pages 881–891.

The arrangement of the filter elements can be operated at a high specific loading with respect to the flow rate of the drying gas exhausted through the filter elements. According to the invention the drying gas is introduced into the chamber at a rate producing at the filter walls 13 a flow rate amounting to at least 150 cubic meters per hour per square meter of the surface of the filter walls 13. Flow rates of this magnitude are substantially beyond the drying gas loading conventionally used for bag filters, but it has turned out to be an essential feature of the invention to obtain a high specific powder loading of the filter walls, which is important for the agglomeration process. The flow rate should preferably be more than 180 and most preferably in the range of 200–600 cubic meters per hour per square meter of the surface of the filter walls 13.

In order to provide an intermittent supply of reverse flow cleaning gas pulses to the interior of each filter element 11 during operation of the spray drying apparatus, the interior of the filter elements 11 is in flow communication with a pressurized air supply, which in FIG. 3 is illustrated by the arrangement of a pressurized air nozzle 14 immediately outside the exhaust gas outlet 15 of each filter element. In a manner known per se, the outlet 15 may provide a venturi-shaped inlet for the intermittently supplied reverse flow pulses.

Figure 4:
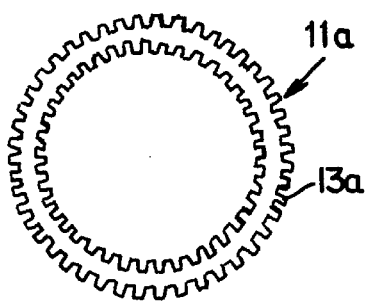
FIG. 4 a cross-sectional view of a modification of the filter element in FIG. 3.

The filter elements 11 may be designed in other shapes than shown. In order to increase the active surface of a filter element 11*a* it could as a modification to a cylindrical wall be advantageous, for example, to give the filter wall 13*a* a surface increasing profiled shape such as the pleated surface shown in the cross-sectional view in FIG. 4.

Figure 5:
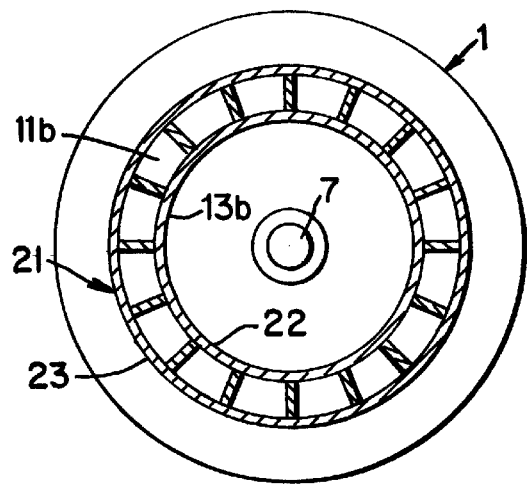
FIG. 5 shows an alternative arrangement of filter elements.

As further illustrated in the cross-sectional view in FIG. 5 the filter elements 11*b* may form separate sections of a single coherent filter assembly 21 having a cylindrical inner and outer wall surface 22 and 23 facing the spraying device 7*a* and forming the filter wall 13*b*. The filter could also be annular and be placed in roof or in the chamber wall.

In the illustrated spray drying apparatus a fluid feedstock supplied to the nozzle-type spraying device 7 will be atomized to droplets which in the underlying nozzle cloud zone 16 of the chamber will be exposed to drying by the drying gas supplied from supply line 9. In the same zone an agglomeration of particles starts and in result heavier particles and agglomerates fall by gravity or by being carried by the drying gas flow towards a further agglomeration zone 17 at the wall of the conical chamber part 4 and towards the fluid-bed 5, whereas fines are carried by the upwards flow of drying gas towards the integrated filter elements 11 to be retained on the surfaces thereof, where also an agglomeration of these particles will take place.

The particles and agglomerates formed on the outer surfaces of the filter elements 11 are as already described released intermittently by supplying reverse flow pulses of pressurized air or gas to the interior of the filter elements 11 through the nozzle means 14 in FIG. 3. The released particles and agglomerates will fall down into the agglomeration zones formed by the nozzle cloud 16 or dependant on their weight further on to the zone 17 at the wall of the conical chamber part 4 or to the fluid-bed 5.

The supply of the reverse flow cleaning pulses of pressurized air or gas is controlled by means of valve 18 in the pressurized air supply line 19 leading to the nozzles 14 in FIG. 3 and is typically generated as short bursts of a duration of 0,05–5 sec. with intervals between 1 sec. and 30 minutes and at a pulse pressure of 1–10 bar.

As a special feature of the invention the integrated filter arrangements of elements 11 provides an attractive and advantageous possibility for cleaning-in-place of the filter elements 11 between periods of operation by supplying a cleaning or washing liquid to the interior of each filter element 11 through a supply line 20. This cleaning procedure is supported by supplying reverse flow pulses to promote the distribution of the cleaning liquid over the entire internal surface of the filter walls 13 by mixing the cleaning liquid with the gas flow pulses in the nozzle means 14 outside the venturi inlet 15 of each filter element 11, as shown in FIG. 3 immediately before spraying.

As an important advantage the cleaning of the filter elements 11 may be performed concurrently with cleaning of the interior of the processing chamber by means not illustrated in the drawings in a single coherent process. Whereby the cleaning of the filter elements 11 from the inside may be assisted by a simultaneous washing of the external side of the filter elements 11.

As shown in dashed lines in FIG. 1 the supply of air or gas to nozzles 14 in FIG. 3 for generation of the reverse flow cleaning pulses may advantageously be taken from the inlet supply 8 of drying gas or from the drying gas outlet, i.e. from the exhaust manifold 10 or in any combination thereof, whereby a separate pressurized air or gas supply can be dispensed with.

The efficiency of method and apparatus of the invention will be illustrated by the following examples

EXAMPLE 1

Fluidized spray drying of Maltodextrine was performed under the following drying conditions:

| | |
|---|---|
| Drying gas inlet temperature: | 150–180° C. |
| Drying gas outlet temperature: | 60–70° C. |
| Inlet temperature to fluid-bed back-mix section: | 90° C. |
| Inlet temperature to fluid-bed plug-flow section | 60° C. |
| Nozzle pressure: | 1.3–1.8 bar |
| Nozzle air/feed ratio: | 0.6–0.7 |
| Drying gas flow rate at filter wall | 166–255 m/hour |
| Feed characteristics: | 30 % DM solution at 20° C. |

The following product characteristics were obtained:

| | |
|---|---|
| Bulk density: (untapped) | 0.35–0.45 kg/l |
| Bulk density (tapped 100×) | 0.40–0.52 kg/l |
| $D_{50}$ (<50%) | 250–300 μm |
| $D_{10}$ (<10%) | 130–160 μm |
| Fines (<90 μm) | 0.5–0.9% |
| Moisture | 3–5% |

Primary particles were obtained with a particle size ranging from 20 to 80 μm verifying agglomerates consisting of a great number of primary particles and a high collision rate between wet particles and partly dried fines.

EXAMPLE 2

Fluidized spray drying of a dairy product was performed under the following drying conditions

| | |
|---|---|
| Drying gas inlet temperature: | 150–190° C. |
| Drying gas outlet temperature: | 65–75° C. |
| Inlet temperature to fluid-bed back-mix section: | 75° C. |
| Inlet temperature to fluid-bed plug-flow section | 45° C. |
| Nozzle pressure: | 1.3–1.8 bar |
| Nozzle air/fluid ratio: | 0.5–0.9 |
| Drying gas flow rate: at filter wall: | 166–255 m/hour |
| Feed characteristics: | 41% DM solution at 50° C. |

The following product characteristics were obtained:

| | |
|---|---|
| Bulk density (untapped): | 0.35–0.55 kg/l |
| Bulk density (tapped 100×): | 0.40–0.65 kg/l |
| $D_{50}$ (<50%): | 220–260 μm |
| $D_{10}$ (<10%): | 110–150 μm |
| Fines (<90 μm) | 2–3% |
| Moisture: | 3–5% |

The primary particles produced were in the range from 20 to 60 μm.

We claim:

1. A method of spray drying a feedstock to produce an agglomerated product, comprising the steps of; supplying said feedstock to at least one spraying device (7) arranged in the upper part (2) of a vertically disposed drying chamber (1), introducing a drying gas into a processing zone (16) of the chamber outside said spraying device, forming a layer of fluidized particles in a lower region of the chamber and exhausting said drying gas from the chamber through outlet means disposed in said upper chamber part, retaining particles carried by the flow of drying gas towards said outlet means and causing said retained particles to agglomerate on a number of filter elements (11) having substantially non-flexible filter walls (13) and being arranged in the upper chamber part (2) separated from said at least one spraying device (7) and in flow communication with said outlet means, intermittently supplying reverse flow gas pulses to said filter elements to release retained particles therefrom to allow said particles to be returned to agglomeration zones (16, 17) in the chamber (1) to participate in the agglomeration in said zones and, introducing said drying gas at a rate producing at said filter walls (13) a flow rate amounting to at least 150 cubic meters per hour per square meter of filter wall surface.

2. A method as claimed in claim 1, characterized in that said flow rate amounts to at least 180 cubic meters per hour per square meter of filter wall surface.

3. A method as claimed in claim 2, characterized in that said flow rate amounts to from 200 to 600 cubic meters per hour per square meter of filter wall surface.

4. A method as claimed in claim 1, characterized in that said reverse flow gas pulses are formed from said drying gas as supplied to (1).

5. A method as claimed in claim 1, characterized in that said reverse flow gas pulses are generated as short bursts of a duration of 0.05–5 sec. with intervals between 1 sec. and 30 minutes and at a pulse pressure of 1–10 bar.

6. A spray drying apparatus for carrying out the method as claimed in claim 1, comprising a vertically disposed drying chamber (1) of substantially circular cross-section, in an upper part (2) of which at least one spraying device is arranged together with feed means (8) for supplying a feedstock and means (9) for introducing a flow of drying gas into a processing zone (16) of said chamber outside said at least one spraying device, whereas in a lower part (4) of the chamber an integrated fluid bed (5) is accommodated for forming and maintaining a fluidized layer of particles resulting from the spray drying performed by the apparatus, outlet means (10) for said drying gas being provided in said upper chamber part (2), wherein a number of filter elements (11) having substantially non-flexible filter walls (13) are arranged in said upper chamber part (2) separated from said at least one spraying device (7) and in flow communication with said outlet means (10) for retaining particles carried by said drying gas towards said outlet means, said filter elements (11) communicating with a pressurized gas supply (19) for intermittently supplying reverse flow pulses of cleaning gas to the filter elements (11) during operation of the spray drying apparatus, and that means are provided for introducing said flow of drying gas at a rate producing at the filter walls a flow rate amounting to at least 150 cubic meters per hour per square meter of filter wall surface.

7. A spray drying apparatus as claimed in claim 6, characterized in that said filter elements (11) are further connected to a supply (20) of cleaning liquid to allow cleaning-in-place of the filter elements in a non-operative condition of the spray drying apparatus.

8. A spray drying apparatus as claimed in claim 7, characterized in that a nozzle (14) is arranged outside an inlet of each filter element (11), said nozzle (14) being connected with said pressurized gas supply (19) and said cleaning liquid supply (20) to effect mixing of the cleaning liquid with pressurized gas immediately prior to supplying said mixture to the interior of the filter element (1).

9. A spray drying apparatus as claimed in claim 7, characterized in that said outlet means (10) are provided at a ceiling (3) of said chamber (1) and that each of said filter elements (11) is of a generally elongated form with one end secured to said chamber ceiling (3).

10. A spray drying apparatus as claimed in claim 6, characterized in that said filter elements (11) are arranged around a single spraying device (7) arranged centrally in said upper chamber part (2).

11. A spray drying apparatus as claimed in claim 9, characterized in that said filter elements form sections (11b) of a single filter assembly (21) having substantially cylindrical inner and outer filter walls (22, 23) facing said spraying device, said sections being separated by partitions.

12. A spray drying apparatus as claimed in claim 6, characterized in that said filter walls (13) are of a substantially rigid material.

13. A spray drying apparatus as claimed in claim 12, characterized in that said substantially rigid material is a sintered metallic material.

14. A spray drying apparatus as claimed in claim 12, characterized in that said substantially rigid filter walls (13a) have a surface increasing configuration.

15. A spray drying apparatus as claimed in claim 6, characterized in that said gas supply (19) for the filter elements is connected to an inlet (9) for drying gas to use said drying gas at said inlet to generate said reverse flow cleaning gas pulses.

16. A method of cleaning a spray drying apparatus as claimed in claim 6, characterized in that cleaning-in-place of the filter elements is performed in a non-operative condition of the spray drying apparatus by supplying a cleaning fluid in reverse flow through the filter elements (11).

17. A method as claimed in claim 16, characterized in that said supply of cleaning liquid is supported by an intermittent supply of pressurized gas pulses for enhanced distribution of said liquid over the internal surface of said filter walls (13).

18. A method as claimed in claim 16, characterized in that said cleaning liquid is mixed with said pressurized gas pulses immediately prior to being supplied to each filter element (11).

19. A method as defined in claim 1, characterized in that said reverse flow gas pulses are formed from said drying gas as supplied and exhausted from said chamber.

20. A spray drying apparatus as claimed in claim 6, characterized in that said gas supply (19) for the filter elements is connected to said outlet means (10) for drying gas to use said drying gas at said outlet means to generate said reverse flow cleaning gas pulses.

* * * * *